United States Patent [19]

Houser et al.

[11] Patent Number: 4,828,709
[45] Date of Patent: May 9, 1989

[54] RECIRCULATING SHOWER USING LIMITED WATER SUPPLY

[76] Inventors: Jack L. Houser, 10041 Millwood Ave., Chatsworth, Calif. 91311; John Pawlak, 5315 Melvin Ave., Tarzana, Calif. 91356

[21] Appl. No.: 85,793

[22] Filed: Aug. 17, 1987

[51] Int. Cl.⁴ ............................................. C02F 9/00
[52] U.S. Cl. ....................................... 210/669; 4/597; 4/598; 4/603; 4/616; 4/DIG. 9; 134/10; 134/18; 210/694; 210/805; 210/143; 210/181; 210/195.1; 210/254; 210/257.1; 210/266
[58] Field of Search ................... 4/596, 597, 598, 602, 4/603, 615, 616, DIG. 9; 134/10, 18; 210/662, 663, 669, 694, 805, 96.1, 143, 167, 175, 181, 195.1, 257.1, 259, 266, 295, 149, 254, 282, 138

[56] References Cited
U.S. PATENT DOCUMENTS

| | | | |
|---|---|---|---|
| 211,874 | 2/1879 | Wasson | 4/603 |
| 3,276,458 | 10/1966 | Iversen et al. | 210/167 |
| 3,870,033 | 3/1975 | Faylor et al. | 210/669 |
| 3,927,425 | 12/1975 | Delaney et al. | 210/195.1 |
| 4,115,879 | 9/1978 | Toms | 210/175 |
| 4,224,700 | 9/1980 | Bloys | 4/616 |
| 4,359,789 | 11/1982 | Roberts | 210/167 |
| 4,700,884 | 10/1987 | Barrett et al. | 4/324 |

Primary Examiner—Ivars Cintins
Attorney, Agent, or Firm—Gene W. Arant

[57] ABSTRACT

A recirculating shower is especially adapted for showering a person's body with a relatively small supply of water. Before it is directed into the shower stall, the water is first recirculated through an alternate series loop pathway and concurrently cleaned and filtered as well as being heated to a desired temperature level. During the showering of the person's body the water continues to be recirculated, cleaned, filtered, and heated. When the showering is completed, the water is again directed through the alternate pathway for further cleaning and filtering, in preparation for a subsequent re-usage.

13 Claims, 1 Drawing Sheet

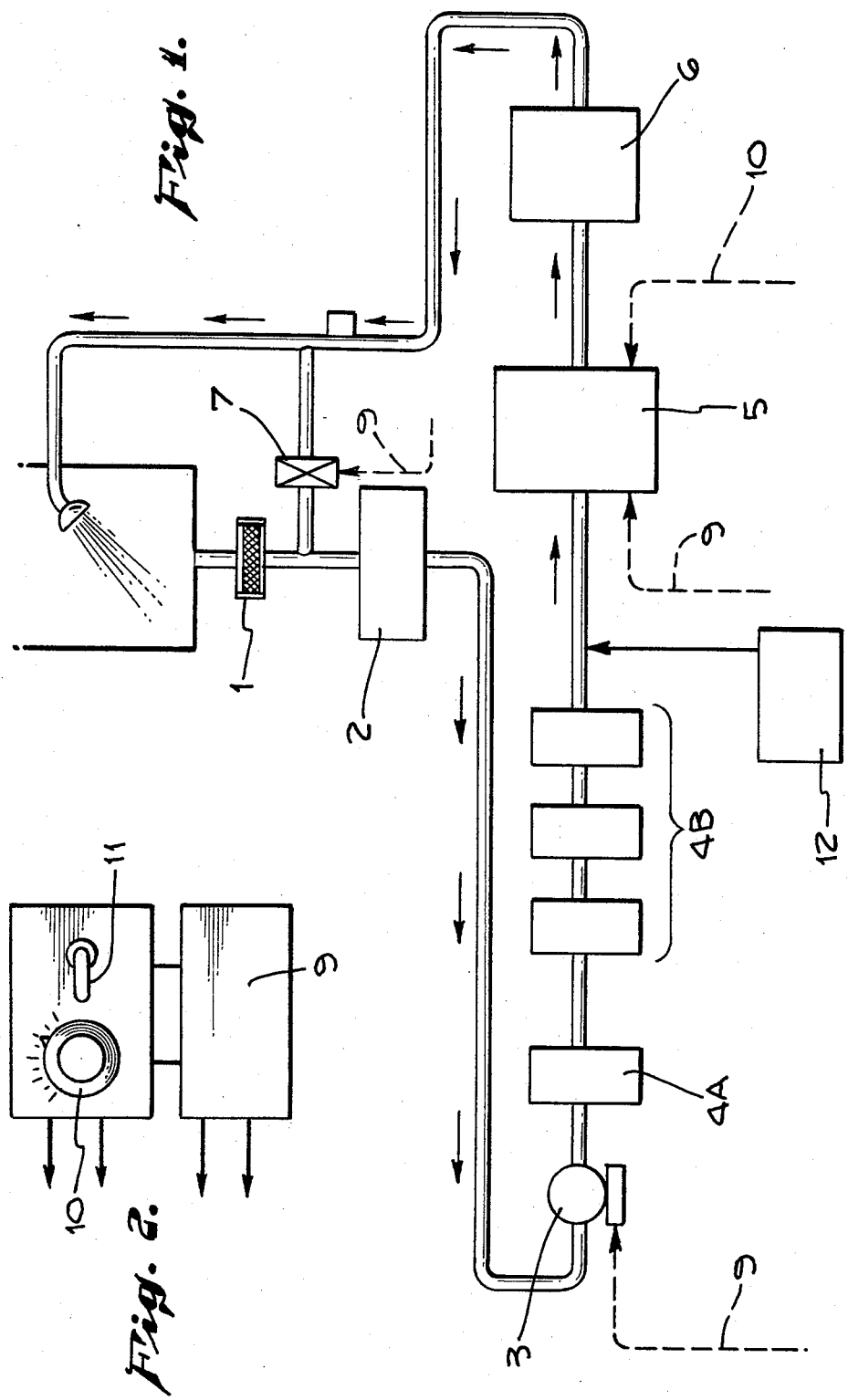

RECIRCULATING SHOWER USING LIMITED WATER SUPPLY

BACKGROUND OF THE INVENTION

There are certain environments where water is in very limited supply, but yet it is quite desirable for persons living in those environments to be able to cleanse themselves regularly by means of a shower. Such environments include recreational vehicles, boats, and desert locations, for example.

In the United States at the present time, it is somewhat commonplace for a recreational vehicle or a boat to be equipped with a shower. Such showers operate in the same manner as the showers traditionally used in homes and in fine hotels—that is, the water is used once and is expelled away to a drain. In the boat or R.V., however, the person using the shower must generally turn the water on for only a short time interval to wet his body, then after applying soap to his body, may turn the water on for another brief period in order to wash and to remove the soap. This method of showering requires the usage of at least about two or three gallons of water, yet is quite unsatisfactory, particularly if compared to showering in the typical home or hotel shower.

In a typical motor home, for example, there is a separate tank to hold the supply of fresh water, typical capacity being 50 gallons. There are also separate tanks for grey (used) water and for sewage. With the present showering technique in a typical recreational vehicle, as described above, the use of the shower for five days will use up about half of the fresh water supply.

SUMMARY OF THE INVENTION

According to the present invention a complete shower system is provided in which the water is continuously recirculated and filtered, making it possible for the person taking the shower to have the water running continuously, and yet resulting in a great reduction in the amount of water that must be available for shower usage.

According to the invention the recirculated water is filtered mechanically and contaminants are removed by an absorption unit containing activated carbon, so that body oil, soap, shampoo, and other contaminants are almost totally removed during each recirculation. The mechanical filtering is accomplished by means of conventional apparatus, and the contaminant absorption is accomplished by the use of activated carbon cartridges which are removable from the system and may be replaced.

The recirculating shower system of the present invention contains its own water heater, and its own fresh and used water tanks, and operates independently of the main water system in a boat or recreational vehicle.

Further according to the invention, the recirculation system of the present invention provides a bypass circuit around the shower head, and control means for causing the water to circulate through the bypass rather than through the shower head and drain. In accordance with the invention, the bypass circuit is used initially for heating the water to a desired temperature before commencing a shower, and again for recirculating the water after the shower is completed so that the filtering of the water may be fully carried out.

The method of showering according to the preferred form of the invention involves first recirculating a quantity of water through a first series loop pathway while concurrently heating and filtering the water, then while continuing to recirculate the water diverting it around a portion of the first series loop pathway and through a second series loop pathway that includes a shower head and a drain so that a person may take a shower with continuously running and heated and filtered water, and then when the person has finished his shower discontinuing the diversion of the water and again recirculating it through the first series loop pathway while additional filtering is accomplished.

Thus, the object and purpose of the present invention is to provide a method and apparatus to enable a person in an environment with very limited water supply to nevertheless take a shower in continuously running water, heated as desired, filtered and cleaned to an acceptable level of cleanliness, and without requiring the use of an undue amount of fresh water.

DRAWING SUMMARY

Reference is made to FIG. 1 of the drawing which is a schematic illustration of the presently preferred form of a recirculating shower system in accordance with the present invention.

FIG. 2 shows a control system according to the invention.

DETAILED DESCRIPTION

Referring now to the sole figure of the drawing, a shower stall has a bottom drain and an elevated shower head. During showering, water from the drain passes through a screen type mechanical filter 1 for removing any large objects from the water. Then the water flows into a dirty (used) water tank 2.

A pump 3 pulls the water through a pipeline as indicated by arrows from the used water tank 2 and drives it through a second mechanical filter 4A. Filter 4A is a polypropylene cartridge of conventional design which allows easy passage of the water but nevertheless causes small floating particles to adhere to the hairs, strings, or similar members which comprise the filter.

Although not specifically shown in the drawing, provision is made to remove and clean the screen filter 1 as necessary, and to remove the cartridge 4A and either clean it or replace it, as may be advisable.

After flowing through filter cartridge 4A the water then flows through a series of filter cartridges 4B. The cartridges 4B are not truly mechanical filters or chemical filters, and their action is more accurately described as physical absorption. Each of the cartridges 4B contains a number of sheets or membranes of cellulose through which the water passes transversely and sequentially. Each sheet or membrane of the cellulose material is impregnated with activated charcoal. As presently preferred, there are three identical ones of the cartridges 4B and the water flows through them sequentially. Also, provision is made for the cartridges to be removed so that they can be periodically replaced.

The filtering and cleaning action is very effective. Actual tests have shown that during a single recirculation of the water a very large percentage, such as perhaps 99%, of body fats, soap, and shampoo are removed from the water. It is true, however, that the activated carbon is not equally effective for all types of soap. In order to achieve the level of effectiveness that is desired it appears to be necessary to use a liquid soap containing detergents that are not precipitated by water hardness.

From cartridges 4B the water flows through a pipe line to a heater 5. Heater 5 is preferably a propane gas type, but may also be an electrical type, with separate high and low output settings. After flowing through the heater the water flows into clean water tank 6.

Before using the system for showering, the water is recirculated through a first series loop pathway that includes a bypass valve 7, but does not include the shower head. The water flow is driven by the pump 3. Bypass valve 7 communicates with the under side of the bottom drain of the shower stall, for bypassing water flow underneath the drain without passing through the shower stall.

When a shower is being taken, pump 3 drives the water through a second series loop path which further includes a pipeline from the clear water tank 6 to the shower head, the shower head itself, and the drain, but does not include the bypass valve. The water recirculates continuously, is filtered and cleaned continuously, and is heated continuously, if heating is required by the thermostat setting. Yet a relatively small supply of water is required, because the used water is being continuously filtered and reused.

Controls for the system include the bypass valve 7 which is controlled by a solenoid, not specifically shown. A thermostat 10 has an adjustable setting so that the shower user may select the water temperature that he or she desires. A timer 9 controls timing operations of the system. As shown by dotted lines, the timer 9 is connected by appropriate circuits to both the pump and the heater, while the thermostat 10 is connected only to the heater. A temperature sensing device associated with the thermostat may, if desired, be connected elsewhere, such as at a point which immediately precedes both the bypass valve 7 and the shower head. A main switch 11 is provided which, through intermediate circuitry, turns on the control system as well as turning on power for the pump and heater.

While it seems essential that the dirty water tank 2, filter 4A, filters 4B, and clean water tank 6, be coupled in sequence as shown in the water flow circuit, it does not necessarily follow that the pump 3 or heater 5 must be located precisely as shown. It may be feasible to locate these items at either earlier or later points in the series loop pathway, although it is necessary that they remain in the first series loop pathway when water is being diverted through the bypass valve 7 around the shower head and drain.

METHOD OF OPERATION

The preferred method of operation is as follows. The shower user first adjusts the thermostat to the desired water temperature. Then he turns on the main switch 11. Turning on of that switch turns on power to automatically cause the bypass valve 7 to open so that water will bypass the shower head. After a slight time delay to allow the bypass valve to open, the turn-on of the power also causes the pump to go on, and at the same time causes the heater to commence operation, either electrically, or by electrical ignition of a gas burner.

Water then recirculates continuously through the first series loop pathway and is heated until it substantially reaches the preset temperature level. A signal is then automatically sent, causing the bypass valve 7 to close. Water now flows through the second series loop path which includes the shower head and the drain. The person who is to take the shower then enters the shower stall so that the water flows around his body. The flow of water then continues until the shower is completed.

The permissible rate of water flow is related to the quantity of carbon in cartridges 4B. If too large a pump is used, the absorption of contaminants may not be as effective as desired.

When the showering is completed, the user turns off the main switch 11. One action initiated by this turn-off is that the heater 5 is immediately shut off. Another immediate action is that the bypass valve 7 is opened, causing water to be diverted around the shower head. Power to the pump 3 is continued, however, for a predetermined period of time, as for example, three minutes. During that period of time all water in the system is recirculated at least once through the filters, and preferably at least twice, thus ensuring a high level of cleanliness of the water stored in the clean water tank 6. After this period of time the pump is turned off and the system shuts down completely.

Cartridges 4B are so effective that the carbon absorb chlorine that is needed for bacteria control. A conventional chlorine dispenser 12 is used to replenish the supply of chlorine.

The activated carbon cartridges act to absorb the soap and fatty materials, but their capacity is limited. After a certain number of showers it is advisable to remove and replace the cartridges 4B with new ones.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. The method of showering a person's body in a recirculating shower, comprising the steps of:

first recirculating a quantity of water through a first series loop pathway while concurrently heating and filtering the water;

then, while continuing to recirculate the water, diverting it from a portion of said first series loop pathway through a second series loop pathway which includes a shower head and a drain, while concurrently applying the continuously recirculated, heated, and filtered water to the person's body for bathing his body with a showering action; and when the showering has been completed, discontinuing the diversion of the water through the shower head and drain and continuing to recirculate it through said first series loop pathway and to filter it at the same time.

2. The method of claim 1 wherein said filtering includes both mechanical filtering and the removal of contaminants by an absorption unit containing activated carbon.

3. The method of claim 2 which is carried out with a relatively small supply of water, and wherein after the showering has been completed, the entire quantity of water is recirculated, filtered, and cleaned at least once.

4. The method of claim 1 wherein a desired temperature level of the water is first established, and wherein the recirculation of the water through said first series loop pathway is continued until the temperature of the water substantially reaches said desired temperature level.

5. The method of claim 4 which is carried out with a relatively small supply of water, and wherein after the showering has been completed, the entire quantity of water is recirculated, filtered, and cleaned at least once.

6. The method of claim 1 which is carried out with a relatively small supply of water, and wherein after the showering has been completed, the entire quantity of water is recirculated, filtered, and cleaned at least once.

7. A recirculating shower system for operation with a relatively small supply of water for showering a person's body, comprising:
a first water passageway having as serially coupled elements thereof a used-water tank, a mechanical filter, an absorption unit containing activated carbon, and a clean-water tank, said first water passageway also having pump means and heating means associated therewith;
a recirculating passageway adapted to be coupled in a first series loop with said first water passageway so that water may be recirculated, heated, and filtered;
a shower coupled in parallel with said recirculating passageway and including a shower head and a drain;
control means for selectively diverting the flow of recirculating water from said recirculating passageway through said shower, and then for subsequently diverting the flow of water back into said recirculating passageway; and
electronic circuit means controlling said control means.

8. The recirculating shower system of claim 7 wherein said absorption unit includes a series of transversely placed elements through which the water passes, and which contain activated carbon.

9. The recirculating shower system of claim 8 wherein said absorption unit is arranged in such a form that it may be removed from the system and replaced with a new one.

10. A recirculating shower system for showering a person's body, comprising:
a first water passageway having as serially coupled elements thereof a used-water tank, a mechanical filter, an absorption unit containing activated carbon, and a clean-water tank, said first water passageway also having pump means and heating means associated therewith;
a recirculating passageway adapted to be coupled in a first series loop with said first water passageway so that water may be recirculated, heated, and filtered;
a shower coupled in parallel with said reirculating passageway and including a shower head and a drain;
control means for selectively diverting the flow of recirculating water from said recirculating passageway through said shower, and then for subsequently diverting the flow of water back into said recirculating passageway, said control means including a bypass valve located within said recirculating passageway and communicating with the under side of said drain; and
electronic circuit means controlling said control means.

11. The recirculating shower system of claim 10 wherein said electronic circuit means includes means for opening said bypass valve, and then, after a time delay to allow the bypass valve to open, for turning on both said pump means and said heating means.

12. The recirculating shower system of claim 11 wherein said absorption unit includes a series of transversely placed elements through which the water passes, and which contain activated carbon;
and wherein said absorption unit is arranged in such a form that it may be removed from the system and replaced.

13. A method of repetitively using a recirculating shower system containing a relatively small supply of water for showering a person's body, and which system includes a shower having a shower head, a drain, and a bypass valve for bypassing water flow underneath the drain, said method comprising the steps of:
first recirculating the water through a series loop pathway that includes the bypass valve, while concurrently filtering it mechanically, removing contaminants by passing it through an absorption unit containing activated carbon, and also heating it, until the water reaches a desired temperature level;
then, while continuing to recirculate, heat, and filter the water, closing the bypass valve so that the water flows through the shower head, and the person may then use the heated and filtered water for bathing his body with a showering action;
when the showering has been completed, again opening the bypass valve and continuing to recirculate the water but discontinuing the heating of it; and
thereafter continuing to recirculate, filter, and clean the water until the entire quantity of water has been recirculated at least once, so that the system is substantially ready for the next shower to be taken.

* * * * *